US012677138B2

(12) United States Patent
Suh

(10) Patent No.: US 12,677,138 B2
(45) Date of Patent: Jul. 7, 2026

(54) METHOD AND APPARATUS FOR UPDATING UE POLICY BASED ON NETWORK SLICING

(71) Applicant: SAMSUNG ELECTRONICS CO., LTD., Suwon-si (KR)

(72) Inventor: Dongeun Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 18/365,126

(22) Filed: Aug. 3, 2023

(65) Prior Publication Data

US 2024/0048966 A1 Feb. 8, 2024

(30) Foreign Application Priority Data

Aug. 3, 2022 (KR) ........................ 10-2022-0096624

(51) Int. Cl.
*H04W 8/24* (2009.01)
*H04W 48/08* (2009.01)
(52) U.S. Cl.
CPC ............. *H04W 8/24* (2013.01); *H04W 48/08* (2013.01)
(58) Field of Classification Search
CPC ............................ H04W 48/18; H04L 12/1407
See application file for complete search history.

(56) References Cited

U.S. PATENT DOCUMENTS

| | | | |
|---|---|---|---|
| 2019/0029065 A1* | 1/2019 | Park | H04W 60/00 |
| 2019/0380104 A1 | 12/2019 | Vrzic et al. | |
| 2020/0077327 A1 | 3/2020 | Duan et al. | |
| 2022/0377529 A1* | 11/2022 | Kim | H04W 8/08 |

(Continued)

FOREIGN PATENT DOCUMENTS

| | | |
|---|---|---|
| CN | 114513799 A | 5/2022 |
| KR | 20210087383 A | 7/2021 |
| KR | 10-2023-0051059 A | 4/2023 |

OTHER PUBLICATIONS

International Search Report and Written Opinion of the International Searching Authority dated Nov. 29, 2023, in connection with International Application No. PCT/KR2023/011368, 7 pages.

(Continued)

*Primary Examiner* — Fabricio R Murillo Garcia

(57) ABSTRACT

The disclosure relates to a 5G or 6G communication system for supporting a higher data transmission rate. A method of a policy control function (PCF) entity in a wireless communication system includes receiving, from an access and mobility management function (AMF) entity, a first user equipment (UE) policy control create request message for UE policy association including a subscription permanent identifier (SUPI) of a UE and a network slice access stratum (AS) group (NSAG) support indication indicating that the LIE supports cell selection and cell reselection based on a network slice priority and transmitting, to the AMF entity, a response message including policy control request (PCR) trigger for change of NSAG instructing transmission of a reporting message in case that at least one of NSAG mapping information indicating a mapping relationship between slice groups and slices or NSAG priority information is changed.

16 Claims, 7 Drawing Sheets

(56) References Cited

U.S. PATENT DOCUMENTS

2023/0052699 A1 * 2/2023 Ninglekhu ........... H04W 48/18

OTHER PUBLICATIONS

Spirent et al., "Update AM, SM and UE Policy control procedures to add NWDAF interaction," 3GPP TSG-SA2 Meeting #143-E, Elbonia, Feb. 24-Mar. 9, 2021, S2-210096, 27 pages.
Supplementary European Search Report dated Sep. 19, 2025, in connection with European Patent Application No. EP23850443.5, 15 pages.
Ericsson, "Enabling Network Slice Access stratum group," 3GPP SA WG2 Meeting #150E S2-2202227, Elbonia, Apr. 6-12, 2022 (was SP-220318), 26 pages.
3GPP TS 23.501 V17.5.0 (Jun. 2022); Technical Specification; 3rd Generation Partnership Project; Technical Specification Group Services and System Aspects; System architecture for the 5G System (5GS); Stage 2 (Release 17) ; 568 pages.

* cited by examiner

METHOD AND APPARATUS FOR UPDATING UE POLICY BASED ON NETWORK SLICING

CROSS-REFERENCE TO RELATED APPLICATIONS

This application is based on and claims priority under 35 U.S.C. § 119 to Korean Patent Application No. 10-2022-0096624, filed on Aug. 3, 2022, in the Korean Intellectual Property Office, the disclosure of which is herein incorporated by reference in its entirety.

BACKGROUND

1. Field

The disclosure relates to a method and an apparatus for updating a user equipment (UE) policy by considering network slicing in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure provides a method and an apparatus for updating a UE policy by considering network slicing in a wireless communication system.

According to an embodiment of the disclosure, a method of a policy control function (PCF) entity in a wireless communication system includes: receiving, from an access and mobility management function (AMF) entity, a first user equipment (UE) policy control create request message for UE policy association including a subscription permanent identifier (SUPI) of a UE and a network slice access stratum (AS) group (NSAG) support indication indicating that the UE supports cell selection and cell reselection based on a network slice priority; and transmitting, to the AMF entity, a response message including policy control request (PCR) trigger for change of NSAG instructing transmission of a reporting message in case that at least one of NSAG mapping information indicating a mapping relationship between slice groups and slices or NSAG priority information is changed.

According to an embodiment of the disclosure, a method of an access and mobility management function (AMF) entity in a wireless communication system includes: receiving, from a user equipment, a registration request message including a network slice access stratum (AS) group (NSAG) support indication indicating that the UE supports cell selection and cell reselection based on a network slice priority; transmitting, to a policy control function (PCF) entity, a first UE policy control create request message for UE policy association including a subscription permanent identifier (SUPI) of the UE and the NSAG support indication; and receiving, from the PCF entity, a response message including policy control request (PCR) trigger for change of NSAG instructing transmission of a reporting message in case that at least one of NSAG mapping information indicating a mapping relationship between slice groups and slices or NSAG priority information is changed.

According to an embodiment of the disclosure, a policy control function (PCF) entity in a wireless communication system includes a transceiver; and a controller operably coupled to the transceiver, the controller configured to: receive, from an access and mobility management function (AMF) entity, a first user equipment (UE) policy control create request message for UE policy association including a subscription permanent identifier (SUPI) of a UE and a network slice access stratum (AS) group (NSAG) support indication indicating that the UE supports cell selection and cell reselection based on a network slice priority; and transmit, to the AMF entity, a response message including policy control request (PCR) trigger for change of NSAG instructing transmission of a reporting message in case that at least one of NSAG mapping information indicating a mapping relationship between slice groups and slices or NSAG priority information is changed.

According to an embodiment of the disclosure, an access and mobility management function (AMF) entity in a wireless communication system includes: a transceiver; and a controller operably coupled to the transceiver, the controller configured to: receive, from a user equipment, a registration request message including a network slice access stratum (AS) group (NSAG) support indication indicating that the UE supports cell selection and cell reselection based on a network slice priority; transmit, to a policy control function (PCF) entity, a first UE policy control create request message for UE policy association including a subscription permanent identifier (SUPI) of the UE and the NSAG support indication; and receive, from the PCF entity, a response message including policy control request (PCR) trigger for change of NSAG instructing transmission of a reporting message in case that at least one of NSAG mapping information indicating a mapping relationship between slice groups and slices or NSAG priority information is changed.

According to an embodiment of the disclosure, an operating method of a policy control function (PCF) in a mobile communication system includes: receiving at least one or more pieces of information of network slice access stratum (AS) group (NSAG) mapping information and NSAG priority information; changing or configuring a UE route selection policy (URSP) rule configured for a UE, based on at least one or more pieces of information of the NSAG mapping information and the NSAG priority information; and transmitting the changed or configured URSP rule to the UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
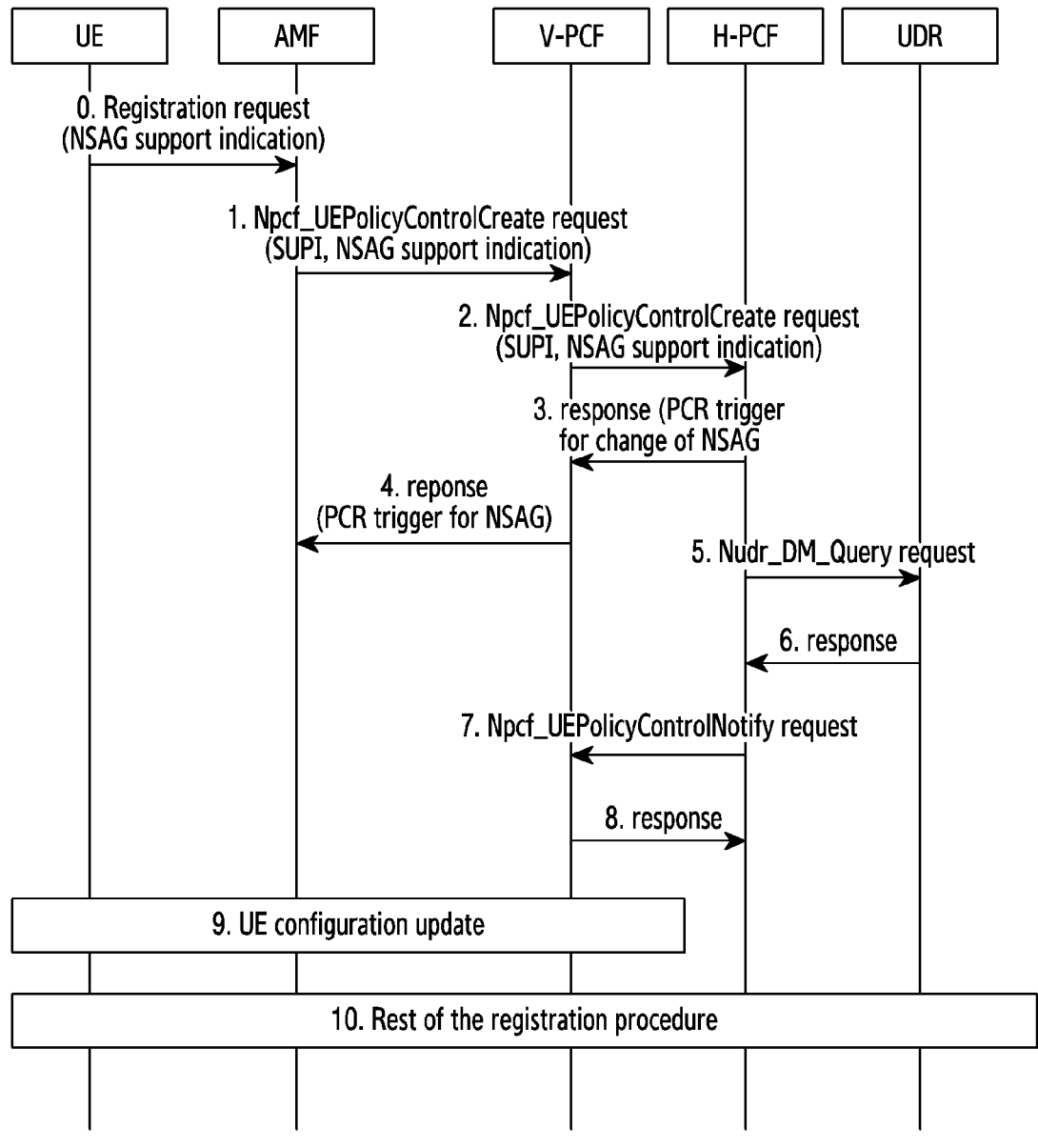
FIG. 1 illustrates a method for configuring information for instructing an access and mobility management function (AMF) to inform a PCF of change when a NSAG priority and NSAG mapping are changed in a UE registration procedure according to an embodiment of the disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, preferred embodiments of the disclosure will be described in detail with reference to the accompanying drawings. It should be noted that the same components are indicated by the same reference numerals in the accompanying drawings. In addition, detailed descriptions of well-known functions and configurations will be omitted since they would unnecessarily obscure the subject matters of the disclosure.

The advantages and features of the disclosure, and methods for achieving the same will be apparent by referring to embodiments, which will be described below in detail along with the accompanying drawings. However, the disclosure is not limited to embodiments disclosed hereinbelow, and may be embodied in many different forms. Embodiments disclosed hereinbelow are provided only to make the disclosure thorough and complete and fully convey the scope of the disclosure to those of ordinary skill in the art, and the disclosure may be defined only by the scope of the appended claims. Throughout the specification, the same reference numerals indicate the same components. In describing the disclosure, detailed descriptions of well-known functions or configurations will be omitted since they would unnecessarily obscure the subject matters of the disclosure. Also, the terms used herein are defined according to the functions of the disclosure. Thus, the terms may vary depending on users' or operators' intentions or practices. Therefore, the terms used herein should be understood based on the descriptions made herein.

Embodiments of the disclosure are mainly about a new radio (NR) which is a radio access network on 5G mobile communication standards, which are specified by 3rd generation partnership project (3GPP) which is a mobile communication standardization group, and a packet core 5G system which is a core network, or a 5G core network or a next generation (NG) core. However, the main features of the disclosure are applicable to other communication systems having a similar technical background with a slight change without departing from the scope of the disclosure, and this may be possible based on decision of those skilled in the art.

In the disclosure, some of the terms and the names defined in 3GPP standards (5G, NR, LTE or standards of similar systems) are used for the convenience of explanation. However, the disclosure is not limited by the terms and the names, and the same may be equally applied to systems conforming to other standards.

As used herein, a term for identifying an access node, terms indicating network entities, terms indicating messages, a term indicating an interface between network entities, terms indicating a variety of identification information are merely examples for the convenience of explanation. Accordingly, the disclosure is not limited to terms described below, and other terms indicating objects having the same technical meanings may be used.

A base station which will be described hereinbelow refers to an entity that performs resource allocations of a terminal, and may be at least one of a gNode B, an eNode B, a Node B, a base station (BS), a radio access unit, a base station controller, or a node over a network. A terminal may include user equipment (UE), a mobile station (MS), a cellular phone, a smartphone, a computer, or a multimedia system capable of performing a communication function. In the disclosure, downlink (DL) refers to a wireless transmission path of a signal that a base station transmits to a terminal, and uplink (UL) refers to a wireless transmission path of a signal that a terminal transmits to a base station.

It will be understood that each block of the process flowcharts described hereinbelow and combinations of the flowcharts may be performed by computer program instructions. These computer program instructions may be loaded into a processor of a generic-purpose computer, a special computer, or other programmable data processing equipment. Therefore, the instructions performed by the processor of the computer or other programmable data processing equipment may generate a means for performing functions explained in the block(s) of the flowcharts. The computer program instructions may be stored in a computer usable or computer readable memory which is directed at a computer or other programmable data processing equipment in order to implement a function in a specific method. Accordingly, the instructions stored in the computer usable or computer readable memory may produce a manufacturing item including an instruction means for performing functions explained in the block(s) of the flowcharts. The computer program instructions may be loaded on a computer or other programmable data processing equipment. Accordingly, a series of operation steps may be performed on the computer or other programmable data processing equipment to generate a process to be executed by the computer, and the instructions performing the computer or other programmable data processing equipment may provide steps for executing functions explained in the block(s) of the flowcharts.

In addition, each block may indicate a part of a module, a segment or a code including one or more executable instructions for executing a specified logical function(s). It should be noted that, in some alternative examples, functions mentioned in blocks may be performed irrespective of an order. For example, two blocks which are successively illustrated may be performed substantially at the same time, or may be performed in the inverse order according to their corresponding functions.

The term "unit" used in the present embodiments refers to a software component or a hardware component such as a field programmable gate array (FPGA) or an application specific integrated circuit (ASIC), and the "unit" performs a certain role. However, the "unit" is not limited to software or hardware. The "unit" may be configured to exist in a storage medium which may address, and may be configured to reproduce one or more processors. For example, the "unit" may include components such as software components, object-oriented software components, class components and task components, and processes, functions, attributes, procedures, sub-routines, segments of a program code, drivers, firmware, microcode, circuit, data, database, data structures, tables, arrays, and variables. Functions provided in the components and the "units" may be coupled with fewer components and "units" or may further be divided into additional components and "units." In addition, the components and the "units" may be implemented to reproduce one or more central processing units (CPUs) in a device or a security multimedia card. In addition, in an embodiment, the "unit" may include one or more processors.

Beyond the initial function of providing a voice-oriented service, a wireless communication system is developing into a broadband wireless communication system which provides a packet data service of high-speed, high quality like communication standards, such as high speed packet access (HSPA) of 3GPP, long term evolution (LTE) or evolved universal terrestrial radio access (E-UTRA), LTE-Advanced (LTE-A), LTE-Pro, high rate packet data (HRPD) of 3GPP2, ultra mobile broadband (UWB), and 802.16e of IEEE.

In an LTE system, which is a representative example of the broadband wireless communication system, an orthogonal frequency division multiplexing (OFDM) scheme may be employed in downlink (DL), and a single carrier-frequency division multiple access (SC-FDMA) scheme may be employed in uplink (UL). The uplink refers to a wireless link through which a terminal (user equipment (UE) or a mobile station (MS)) transmits data or a control signal to a base station (eNode B or a base station (BS)), and the downlink refers to a wireless link through which a base station transmits data or a control signal to a terminal. In addition, the above-described multiple access schemes may assign or manage time-frequency resources for carrying and transmitting data or control information for each user not to overlap one another, that is, to establish orthogonality, and thereby distinguish data or control information of each user.

A 5G communication system which is a post-LTE communication system should support a service satisfying various requirements simultaneously so as to freely reflect various requirements of a user and a service provider. Services which are considered for the 5G communication system may include enhanced mobile broadband (eMBB), massive machine type communication (mMTC), ultra-reliability low latency communication (URLLC).

eMBB aims at providing a high data transmission speed which is more enhanced in comparison to a data transmission speed supported by existing LTE, LTE-A, or LTE-Pro. For example, in a 5G communication system, eMBB should be able to provide a peak data rate of 20 Gbps in downlink and to provide a peak data rate of 10 Gbps in uplink from the point of view of one base station. In addition, the 5G communication system should provide an increased user perceived data rate of a terminal, while providing the peak data rate. In order to meet the requirements described above, there may be a need for enhancement of various transmission and reception technologies including an enhanced multi input multi output (MIMO) transmission technology. In an LTE system, signals are transmitted by using a maximum transmission bandwidth of 20 MHz in a 20 GHz band. On the other hand, in a 5G communication system, a frequency bandwidth larger than 20 MHz is used in a frequency band of 3-6 GHz or 6 GHz or more, so that a data transmission rate required in the 5G communication system may be satisfied.

At the same time, mMTC is being considered to support an application service such as Internet of thing (IoT) in the 5G communication system. mMTC may require support of access by massive terminals within a cell, enhanced coverage of a terminal, an increased battery time, reduction in a cost of a terminal in order to provide IoT efficiently. Since IoT is attached to various sensors and various devices to provide a communication function, IoT should be able to support many terminals (for example, 1,000,000 terminals/km2) within a cell. In addition, since terminals supporting mMTC are likely to be positioned in a shaded region that is not covered by a cell, such as a basement of a building, due to characteristics of a service, the service of mMTC may require a broader coverage compared to other services provided by the 5G communication system. Since terminals supporting mMTC should be configured with low-priced terminals, and there may be difficulty in replacing a battery of a terminal frequently, there may be a need for a long battery life time, for example, a battery life of 10-15 years.

Lastly, URLLC is a cellular-based wireless communication service which is used for a specific purpose (mission-critical). For example, services used for remote control of a robot or a machinery, industrial automation, an unmanned aerial vehicle, remote health care, an emergency alert are being considered. Accordingly, communication provided by URLLC should provide very low latency and very high reliability. For example, services supporting URLLC should satisfy air interface latency shorter than 0.5 millisecond, and simultaneously, should satisfy requirements of a packet error rate of $10^{-5}$ or less. Accordingly, the 5G system should provide a shorter transmit time interval (TTI) than other services in order to provide a service supporting URLLC, and simultaneously, may need to meet design requirements to allocate broad resources in a frequency band in order to guarantee reliability of a communication link.

The three services considered in the 5G communication system, that is, eMBB, URLLC, mMTC, may be multiplexed in one system and may be transmitted. In this case, in order to satisfy different requirements of respective services, different transceiving techniques and transceiving parameters may be used between services. Of course, the 5G communication system is not limited to the above-described three services.

In a 3GPP 5G system, a network slice group priority and mapping information between a network slice and a network slice group are provided to a terminal in order for the terminal to select and reselect a cell based on slicing. When there exist tracking areas (TAs) that use different mapping rules, mapping information according to a position may be separately provided to the terminal.

The terminal may store a network slice access stratum (AS) group (NSAG) priority (that is, a slice group priority) received from a network as configuration information, and may determine a cell to connect by considering the priority of the NSAG and slices supported by cell (that is, NSAGs). When the cell to connect is determined, the terminal may perform a registration procedure through a radio access network (RAN) node (that is, a base station) supporting the corresponding cell, and may receive an allowed slice set (NSSAI) from the network. The terminal may establish a PDU session with respect to slice identifiers (single network slice selection assistance information (S-NSSAI)) included in the allowed NSSAI, and may transmit/receive application traffic. If the terminal stores a UE route selection policy (URSP) rule provided from the network as configuration information, the terminal determines which S-NSSAI will be used when transmitting/receiving specific traffic (for example, a specific application), based on a network slice selection policy (NSSP) included in the URSP rule. Various S-NSSAIs for certain traffic may be included in the NSSP stored as configuration information of the terminal in sequence, and the terminal may try to transmit corresponding traffic of the S-NSSAIs in the same sequence.

Since the NSAG priority and the URSP rule are independently determined (the NSAG priority is determined at an AMF, whereas the URSP rule is determined at a (H–) policy control function (PCF)), importance on the slice may not consistently be reflected. Accordingly, there is a need to determine the NSAG priority and the URSP rule (NSSP) by considering each other. The disclosure provides a method for solving the above-described problems.

If different types of slice-related priority information (for example, a NSAG priority and a URSP rule) provided to a terminal as configuration information in a 3GPP 5G system are determined without considering each other and provided to a terminal, various problems may arise. For example, network slices related to a specific application may be configured with slices included in a NSAG having a low cell reselection (or cell selection) priority in the URSP rule. In this case, when the terminal selects a cell based on the URSP rule, there may not exist a slice that uses a corresponding application among allowed slices received from a network, and to this end, corresponding application traffic exchange may be impossible.

According to an embodiment of the disclosure, a URSP rule including slice, traffic-specific slice priority information, and a NSAG priority including slice priority information used when a terminal selects and reselects a cell are consistently determined, so that the above-described problems is prevented from arising. In addition, according to an embodiment, when information of slices to be used for each application traffic is determined with the URSP rule, slice availability of application traffic may be enhanced by considering NSAG mapping (that is, information regarding which slices a slice group is mapped onto).

A 5G mobile communication network includes a 5G UE (terminal), a 5G radio access network (RAN) (a base station, a 5G nodeB (gNB), an evolved nodeB (eNB)), and a 5G core network. The 5G core network may include network functions, such as an access and mobility management function (AMF) of providing a mobility management function of a UE, a session management function (SMF) of providing a session management function, a user plane function (UPF) of performing a data transfer role, a policy control function (PCF) of providing a policy control function, unified data management (UDM) of providing a function of management of data such as subscriber data and policy control data, a unified data repository (UDR) storing data of various network functions of the UDM.

Network slicing in a 5G system refers to a technology and a structure that enables virtualized, independent, various logic networks in one physical network. A network operator constitutes a virtual end-to-end network which is named a network slice and provides a service in order to satisfy specialized requirements of a service/application. In this case, the network slice is identified by an identifier named single-network slice selection assistance information (NS-SAI). The network transmits a set of allowed slices (for example, allowed NSSAIs) to a terminal in a terminal registration procedure (for example, a UE registration procedure), and the terminal transmits or receives application data through a protocol data unit (PDU) session which is generated through one S-NSSAI (that is a network slice) among the slices.

A base station in the 5G system is responsible for one or more tracking areas (TAs) (a unit defined to track a position of a terminal in the 5G system), and different frequencies and difference network slices may be supported in each TA or in each cell in a TA. The base station may broadcast network slice information supported in each TA to a terminal, and the terminal may identify which network slice is supported in each TA, based on the corresponding information. In this case, the TA-specific slice information or cell-specific slice information which is broadcasted by the base station may include information of an identifier (that is a slice group ID) regarding a slice group onto which the corresponding S-NSSAI is mapped, instead of the S-NSSAI. The terminal may identify which slice groups are supported in each TA (that is, slice groups supported by cells in each TA), and may identify which S-NSSAIs are supported in each TA (that is, S-NSSAIs supported by cells in each TA), based on mapping relationship information between the S-NSSAI received from the AMF through a non-access stratum (NAS) (a communication protocol between UE and AMF), and the slice group ID.

The terminal may determine a cell based on a priority value for each S-NSSAI or slice group ID received from the NAS, and based on slice-related information broadcasted from the base station in a cell re-selection process which is a procedure for selecting a more appropriate cell. For example, when a network operator wishes to move the terminal to a cell where a specific slice is supported, a high priority may be given to the corresponding slice or a slice group including the corresponding slice.

In a 5G base station, mapping between a slice group ID and an S-NSSAI may be configured in the unit of TA. Accordingly, a different mapping rule between the slice group ID and the S-NSSAI may be applied to each TA. For example, the same slice group ID may be an identifier indicating different S-NSSAIs in different TAs. A terminal may receive, from an AMF through a NAS in a network registration procedure, mapping relationship information between S-NSSAI related to some TAs (for example, TAs belonging to a registration area (RA)) and an slice group ID. In this case, when there exist TAs that use different mapping rules for slices for mapping, a corresponding TA and different mapping relationship information in the corresponding TA may be included and transmitted. The terminal may perform a network registration procedure again when the terminal moves to a TA other than an RA received in the last network registration procedure, and may receive mapping information between a slice group ID related to new TAs and S-NSSAI.

The terminal may store a network slice access stratum (AS) group (NSAG) priority (that is, a slice group priority) received from the network as configuration information, and may determine a cell to connect by considering the priority of the NSAG and slices supported by cell (that is, NSAGs). When the cell to connect is determined, the terminal may perform a registration procedure through a radio access network (RAN) node (that is, a base station) supporting the corresponding cell, and may receive an allowed slice set (NSSAI) from the network. The terminal may establish a PDU session with respect to slice identifiers (S-NSSAI) included in the allowed NSSAI, and may transmit/receive application traffic. If the terminal stores a UE route selection policy (URSP) rule provided from the network as configuration information, the terminal determines which S-NSSAI will be used when transmitting/receiving specific traffic (for example, a specific application), based on a network slice selection policy (NSSP) included in the URSP rule. Various S-NSSAIs for certain traffic may be included in the NSSP stored as configuration information of the terminal in sequence, and the terminal may try to transmit corresponding traffic of the S-NSSAIs in the same sequence.

If different types of slice-related priority information (for example, a NSAG priority and a URSP rule) provided to a terminal as configuration information in a 3GPP 5G system are determined without considering each other and provided to a terminal, various problems may arise. For example, network slices related to a specific application may be configured with slices included in a NSAG having a low cell reselection (or cell selection) priority in the URSP rule. In this case, when the terminal selects a cell based on the URSP rule, there may not exist a slice that uses a corresponding application among allowed slices received from a network, and to this end, corresponding application traffic exchange may be impossible.

According to an embodiment of the disclosure, a URSP rule including slice, traffic-specific slice priority information, and a NSAG priority including slice priority information used when a terminal selects and reselects a cell are consistently determined, so that the above-described problems is prevented from arising. In addition, according to an embodiment, when information of slices to be used for each application traffic is determined with the URSP rule, NSAG mapping (that is, information regarding which slices a slice group is mapped onto) may be considered. Information expressed by a NSAG priority or slice priority information in embodiments of the disclosure may include a slice-specific priority (that is, S-NSSAI-specific priority information) or a slice group-specific priority (that is, priority information of each slice group indicating one or more pieces of S-NSSAI).

FIG. 1 illustrates a method of configurating information for instructing an AMF to inform a PCF of change when a NSAG priority and NSAG mapping are changed in a UE registration procedure according to an embodiment of the disclosure.

Step 0. A UE registration procedure proceeds. A UE (terminal) transmits a registration request message to an AMF through a RAN.

The corresponding message may include a UE ID, a NSAG support indication (that is, information indicating that the UE supports cell selection and cell reselection based on a network slice priority), a UE policy container.

When the UE provides the NSAG support indication, the AMF may store the same.

Step 1. The AMF may proceed with a UE policy association procedure. To achieve this, the AMF may transmit a Npcf_UEpolicyControlCreate request message to a V-PCF. When the UE is not roaming, the V-PCF may operate as a H-PCF and step 2 and step 3 may be omitted.

In an embodiment, the UE policy association procedure may proceed in the middle of the registration procedure starting at step 0. In addition, the UE policy association procedure may proceed after the registration procedure starting at step 0 is completed.

The AMF may add the following information to the message to be transmitted to the V-PCF:

subscription permanent identifier (SUPI): Identifier information of the UE;

NSAG support indication: When the UE provides the NSAG support indication, the NSAG support indication is added to the message to be transmitted to the V-PCF;

H-PCF ID: When the UE is roaming, the H-PCF ID may be included; and

UE policy container: When the UE provides the UE policy container, the UE policy container may be included.

Step 2. The V-PCF forwards the message received at step 1 to the H-PCF. In this case, the H-PCF may determine based on the H-PCF ID included in the message received at step 1.

Step 3. When the message received at step 2 includes the NSAG support indication, the H-PCF may add information related to a PCR trigger for change (or update) of NSAG to a response message to be transmitted to the V-PCF.

In an embodiment, the information related to the PCR trigger for change of NSAG is information for instructing the AMF to transmit a reporting message to inform the PCF, or the H-PCF through the V-PCF if the terminal is roaming, that NSAG mapping (that is, information indicating a mapping relationship between slice groups and slices) or a NSAG priority (NSAG-specific priority information considered by the UE when the UE selects and reselects a cell) is changed when such a change is detected. The AMF which receives the information related to the PCR trigger for change of NSAG may add changed NSAG mapping or NSAG priority to a message to be transmitted to the PCF or the V-PCF when the NSAG priority or the NSAG mapping is changed.

Step 4. The V-PCF transmits the message received from the H-PCF to the AMF. When the UE is not roaming, the V-PCF may operate as the H-PCF, and, if the UE provides the NSG support indication, the V-PCF may add the PCR trigger for NSAG to a response message.

Step 5. The H-PCF transmits a message requesting subscription information of the UE (Nudr_DM_Query) to a UDR.

Step 6. The UDR adds subscription information of the UE to a response message to be transmitted to the H-PCF, and transmits the response message.

Step 7. The H-PCF determines a UE policy based on the subscription information of the UE received from the UDR. The UE policy may include a URSP rule and access network discovery & selection policy (ANDSP). The H-PCF adds the UE policy to a UE policy container and then transmits a Npcf_UEPolicyControlNotify request message to the V-PCF.

The H-PCF may consider the NSAG priority and the NSAG mapping in determining the UE policy.

When the NSAG priority and the NSAG mapping are transmitted to the H-PCF through the V-PCF based on the PCR trigger for NSAG, or the H-PCF receives the NSAG support indication on the UE but information is not provided from the AMF by the PCR trigger, the H-PCF may transmit a message requesting from the AMF through the V-PCF.

Step 8. The V-PCF transmits a response message to the H-PCF.

Step 9. When the V-PCF receives the UE policy container from the H-PCF, a UE configuration update procedure for transmitting the UE policy container to the UE is performed.

The V-PCF transmits the UE policy container to the UE through the AMF.

Step 10. The rest of the registration procedure is performed.

Figure 2:
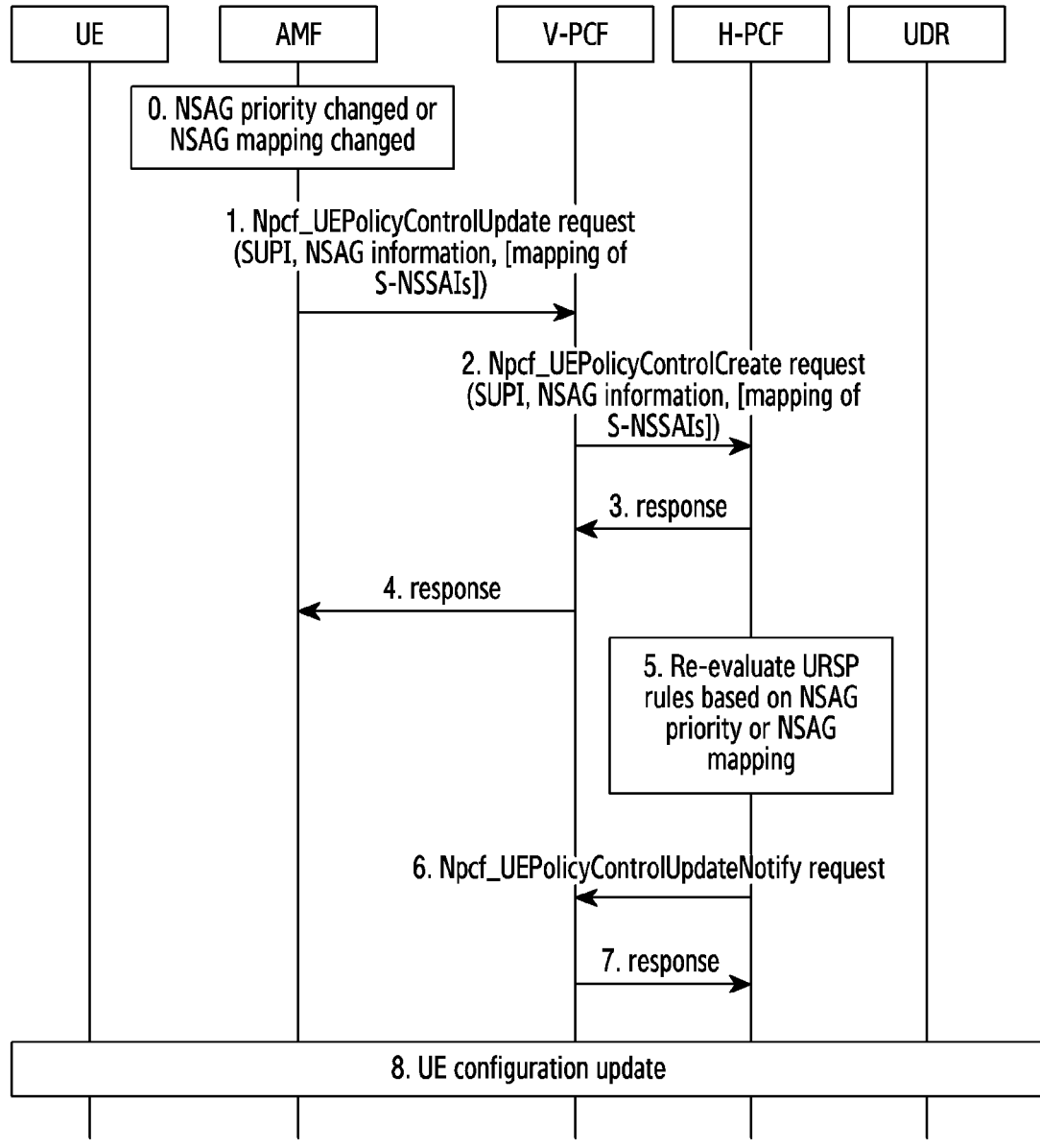
FIG. 2 illustrates a method of providing a UE with a UE policy which is updated based on a changed NSAG priority or NSAG mapping when the NSAG priority or NSAG mapping is changed according to an embodiment of the disclosure.

FIG. 2 illustrates a method of providing a UE with a UE policy which is updated based on change in a NSAG priority or NSAG mapping when the NSAG priority or the NSAG mapping is changed according to an embodiment of the disclosure.

Step 0. The AMF knows that a NSAG priority is changed (or updated) or NSAG mapping is changed (or updated).

Step 1. When the UE is not roaming, the V-PCF performs the role of the H-PCF at step 2 and step 3, and step 2 and step 3 may be omitted.

In an embodiment, if the AMF already receives PCR trigger information on the NSAG priority information and the NSAG mapping information from the H-PCF, the AMF may determine to transmit a Npcf_UEpolicyControlCreate request message to the V-PCF due to the PCR trigger when the PCR trigger information on the NSAG priority information and the NSAG mapping information is changed. When the NSAG priority information and the NSAG mapping information are changed, the AMF may determine to transmit the message to the V-PCF even if there is no PCR trigger.

The message that the AMF transmits to the V-PCF may include the following information:

SUPI: Identifier information of the UE;

NSAG information: NSAG mapping information or NSAG priority information, wherein corresponding information which is changed at step 0 is included;

Mapping of S-NSSAIs: Information included when the UE is roaming, including information indicating a mapping relationship between a V-PLMN S-NS SAI (that is, slice identifier information of a visiting network) and a H-PLMN S-NSSAI (that is, slice identifier information of a home network), wherein slice identifiers included in the NSAG information correspond to the V-PLMN S-NSSAI, and accordingly, this information is used by the H-PCF located at the home network to understand, wherein, when the AMF has transmitted the mapping of S-NSSAIs to the corresponding H-PCF and there is no change in the mapping of S-NS SAIs after transmission, the corresponding information may not be included.

H-PCF ID: Information included when the UE is roaming, including identifier information of the H-PCF Step 2. The V-PCF forwards the message received at step 1 to the H-PCF. In this case, the V-PCF may select the H-PCF based on a H-PCF ID included in the message received at step 1.

Step 3. The H-PCF transmits a response message to step 2 to the V-PCF.

Step 4. The V-PCF transmits a response message to step 1 to the AMF.

Step 5. When the message received at step 2 includes NSAG mapping information, NSAG priority information or both the NSAG mapping information and the NSAG priority information, the H-PCF may identify whether there is a need to change the URSP rule already determined for the UE, based on the corresponding information. If there is no URSP rule that is determined for the UE, the H-PCF may determine a URSP rule by considering the corresponding information.

Step 6. When the H-PCF determines a new URSP rule, a Npcf_UEPolicyControlUpdateNotify request message to be transmitted to the V-PCF may include a UE policy container including the new URSP rule. The V-PCF may transmit the UE policy container including the new URSP rule to the UE through the AMF and the RAN. When the message that the UE receives through the RAN includes the UE policy container and the UE policy container includes the new URSP rule, the UE may delete an existing URSP rule and may use the received new URSP rule.

Step 7. The V-PCF transmits a response message to step 5.

Step 8. A UE configuration update procedure proceeds. The V-PCF adds the UE policy container received at step 5 to a message to be transmitted to the UE through the AMF and the RAN. When the message that the UE receives through the RAN includes the UE policy container and the UE policy container includes the new URSP rule, the UE may delete the existing the URSP rule and may use the received new URSP rule.

Figure 3:
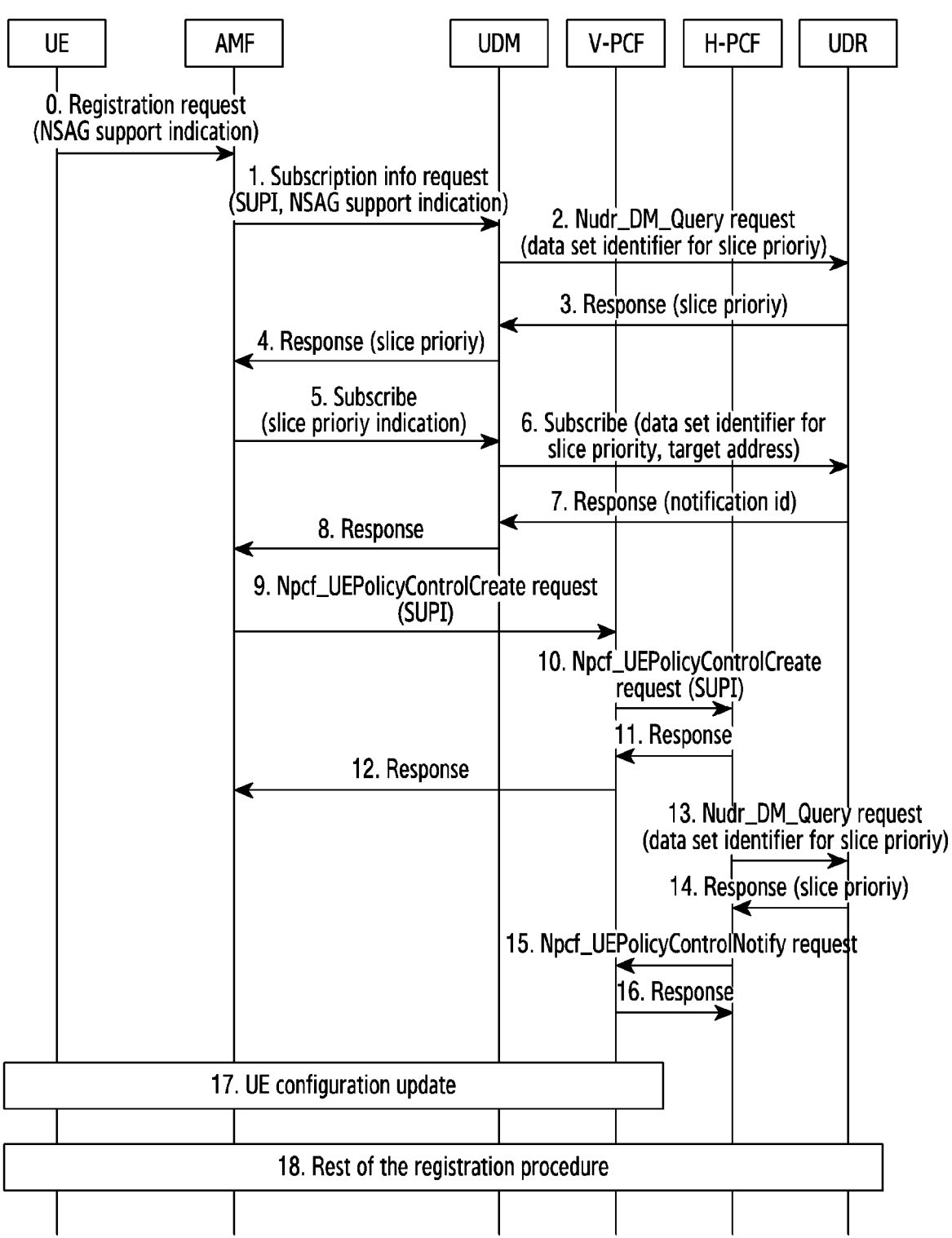
FIG. 3 illustrates a procedure in which a unified data repository (UDR) provides slice priority information for cell selection and cell re-selection in a UE registration procedure according to an embodiment of the disclosure.

FIG. 3 illustrates a procedure in which a unified data repository (UDR) provides slice priority information for cell selection and cell re-selection in a UE registration procedure according to an embodiment of the disclosure.

Step 0. A UE registration procedure proceeds. The UE (terminal) transmits a registration request message to the AMF through the RAN.

The corresponding message may include a UE ID, a NSAG support indication (that is, information indicating that the UE supports cell selection and cell reselection based on a network slice priority), a UE policy container.

When the UE provides the NSAG support indication, the AMF may store the same.

Step 1. The AMF may add the following information to a subscription info request message that the AMF transmits to the UDM in order to acquire subscription information of the UE:

SUPI: UE identifier information; and

NSAG support indication: This information is included when the NSAG support indication is received from the UE at step 0.

Step 2. When the message that the UDM receives at step 1 includes the NSAG support indication, the UDM requests slice priority information from the UDR. The slice priority information may include a slice group-specific priority or a slice identifier-specific priority. In this case, a Nudr_DM_Query request message that is transmitted to the UDR may include SUPI, UE position information, information indicating slice priority information.

Step 3. When the information received at step 2 includes SUPI, information indicating slice priority information, the UDR adds the slice priority information to a response message to be transmitted to the UDM.

When the information received at step 2 includes UE position information, the UDR may add slice priority information corresponding to the SUPI and the UE position information to the response message. In this case, the position information may be provided in the form of GNSS coordinates, a tracking area (TA) identifier, a cell identifier.

If the information received at step 2 does not include the SUPI and includes the UE position information, the UDR may add slice priority information on the UE position information.

If the information received at step 2 does not include the SUPI, the UDR may add slice priority information that is equally applied to all UEs and positions.

Step 4. The UDM forwards the message received at step 3 to the AMF.

Step 5. When the AMF receives the NSAG support indication from the UE at step 0, the AMF may transmit a subscribe request message requesting the UDM to inform of change (or update) of the slice priority information to the UDM when such a change is made. The corresponding message may include information indicating slice priority information (slice priority indication), an address of the AMF for receiving a notification (target address), the SUPI, and the UE position information.

Step 6. When the UDM receives the subscribe request message regarding the slice priority information from the AMF at step 5, the UDM may transmit the subscribe request message regarding the slice priority information to the UDR. The corresponding message may include an identifier indicating a data set on the slice priority information (data set identifier for slice priority), an address of the UDM for receiving a notification (target address).

Step 7. The UDR transmits a response message to step 6 to the UDM. The corresponding message may include a notification ID that is generated to identify subscription and a notification when the corresponding subscription and notification are transmitted or received.

Step 8. The UDM transmits a response message to step 5 to the AMF.

Step 9. The AMF may proceed with a UE policy association procedure. When the UE is not roaming, the V-PCF may operate as the H-PCF and the V-PCF may be omitted.

In an embodiment, the UE policy association procedure may proceed in the middle of the registration procedure starting at step 0. In addition, the UE policy association procedure may proceed after the registration procedure starting at step 0 is completed.

The AMF may add the following information to a message to be transmitted to the V-PCF:

SUPI: Identifier information of the UE;

NSAG support indication: NSAG support indication added to a message to be transmitted to the V-PCF when the UE provides the NSAG support indication;

H-PCF ID: H-PCF ID added when the UE is roaming; and

UE policy container: UE policy container added when the UE provides the UE policy container.

Step 10. The V-PCF forwards the message received at step 1 to the H-PCF. In this case, the H-PCF may determine based on a H-PCF ID included in the message received at step 1.

Step 11. When the message received at step 10 has the NSAG support indication, the H-PCF may add information related to a PCR trigger for change of NSAG to a response message to be transmitted to the V-PCF.

In an embodiment, the information related to the PCR trigger for change of NSAG is information for instructing the AMF to transmit a reporting message to inform the PCF, or the H-PCF through the V-PCF if the terminal is roaming, that NSAG mapping (that is, information indicating a mapping relationship between slice groups and slices) or a NSAG priority (NSAG-specific priority information considered by the UE when the UE selects and reselects a cell) is changed when such a change is detected. The AMF which receives the information related to the PCR trigger for change of NSAG may add changed NSAG mapping or NSAG priority to a message to be transmitted to the PCF or the V-PCF when the NSAG priority or the NSAG mapping is changed.

Step 12. The V-PCF transmits the message received from the H-PCF to the AMF. When the UE is not roaming, the V-PCF may operate as the H-PCF, and, if the UE provides the NSG support indication, the V-PCF may add the PCR trigger for NSAG to a response message.

Step 13. The H-PCF transmits a message requesting subscription information of the UE (Nudr_DM_Query request) to the UDR. When the H-PCF receives the NSAG support indication on the UE from the AMF or the V-PCF, the H-PCF may add an identifier indicating a data set on slice priority information to the message to be transmitted to the UDR. In addition, the H-PCF may transmit a request message for subscribing to a change of the data set on the slice priority information to the UDR.

In an embodiment, the H-PCF may transmit, to the UDR, a request for slice priority information and a subscribe message on a UE from which a NSAG support indication is not received.

Step 14. The UDR adds subscription information of the UE to a response message to be transmitted to the H-PCF, and transmits the response message. When the message received at step 13 includes the data set identifier regarding the slice priority information, the UDR adds the slice priority information to the response message.

Step 15. The H-PCF determines a UE policy based on the subscription information of the UE received from the UDR at step 6. The UE policy may include a URSP rule and an ANDSP. The H-PCF adds the UE policy in a UE policy container and then transmits a Npcf_UEPolicyControlNotify request message to the V-PCF.

The H-PCF may consider the NSAG priority and the NSAG mapping in determining the UE policy.

Step 16. The V-PCF transmits a response message to the H-PCF.

Step 17. When the V-PCF receives the UE policy container from the H-PCF, the V-PCF performs a UE configuration update procedure to transmit the UE policy container to the UE.

The V-PCF transmits the UE policy container to the UE through the AMF.

Step 18. The rest of the registration procedure is performed.

Figure 4:
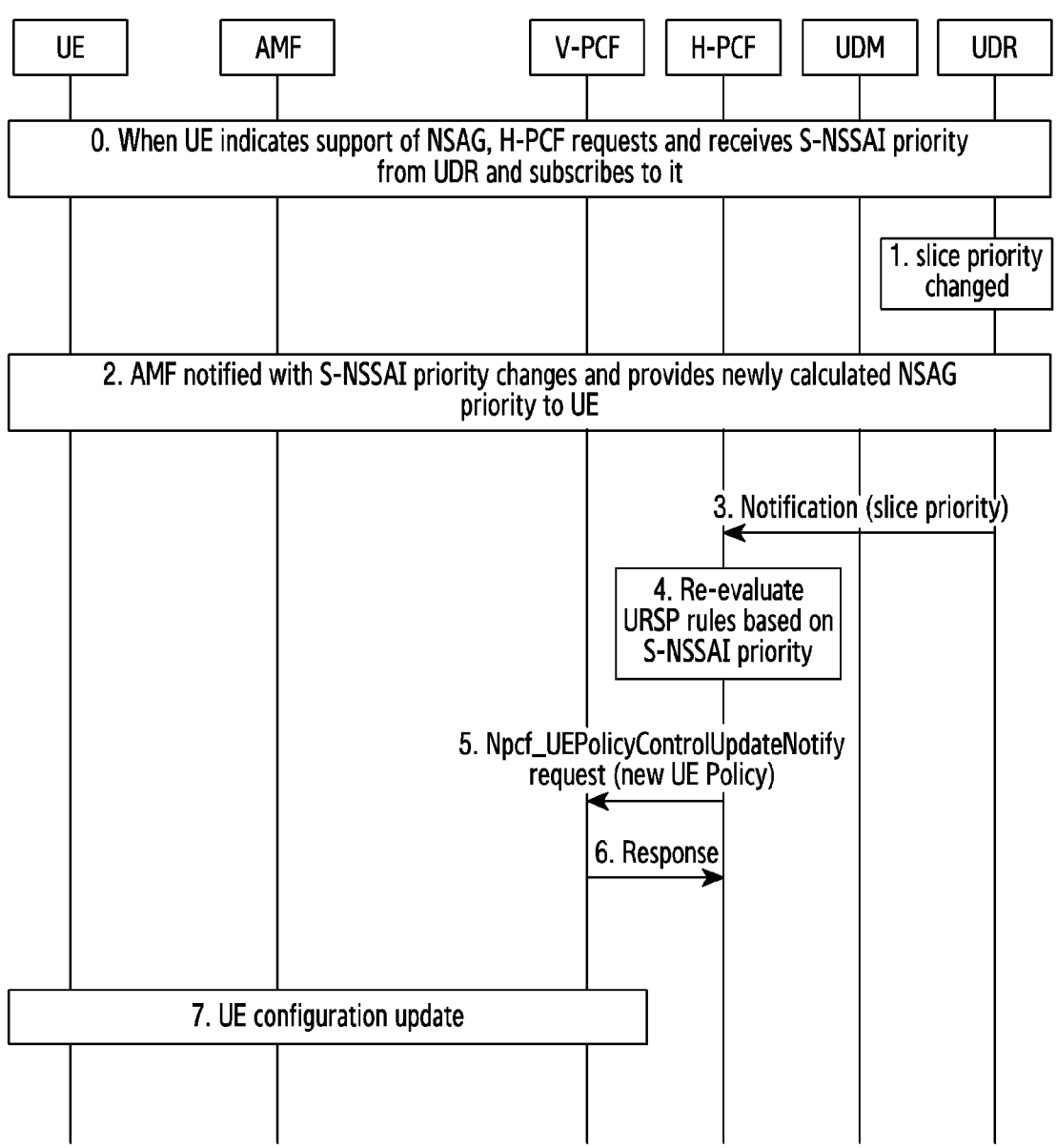
FIG. 4 illustrates a method of transmitting, to a UE, a UE policy which is updated based on a changed slice priority when the slice priority is changed at a UDR according to an embodiment of the disclosure.

FIG. 4 illustrates a method of transmitting a UE policy which is updated based on a changed slice priority to a UE when the slice priority is changed at a UDR according to an embodiment of the disclosure.

Step 0. When the H-PCF receives a NSAG support indication, a SUPI, UE position information from the AMF in a UE policy association procedure, the H-PCF may add the SUPI, the UE position information, information indicating slice priority information to a message to be transmitted to the UDR. The UDR may add the slice priority information to a response message thereto. The H-PCF may calculate a URSP rule by considering the slice priority information and then may add the URSP rule to the UE policy container, and may transmit the UE policy container to the UE through the V-PCF and the AMF.

Step 1. The slice priority information is changed (or updated) at the UDR. For example, the slice priority information may be changed according to a change (or update) in subscribed S-NSSAIs of the UE, an operator policy.

Step 2. The UDR informs the AMF of the changed slice priority information, and the AMF adds the changed slice priority information to a message to be transmitted to the UE.

Step 3. When the slice priority information is changed at the UDR, the UDR adds the changed slice priority information to a message to be transmitted to the H-PCF.

Step 4. When slice priority information is received at step 3, the H-PCF identifies whether the URSP rule should be newly calculated based on the slice priority information.

Step 5. When a URSP rule is newly determined at step 4, the H-PCF adds a UE policy container including the newly calculated URSP rule to a Npcf_UEPolicyControlUpdateNotify request message to be transmitted to the V-PCF.

Step 6. The V-PCF transmits a response message to step 5.

Step 7. A UE configuration update procedure proceeds. The V-PCF adds the UE policy container received at step 5 to a message to be transmitted to the UE through the AMF and the RAN. When the message received through the RAN includes the UE policy container and a new URSP rule is included in the UE policy container, the UE may delete an existing USRP rule and may use the newly received URSP rule.

Figure 5:
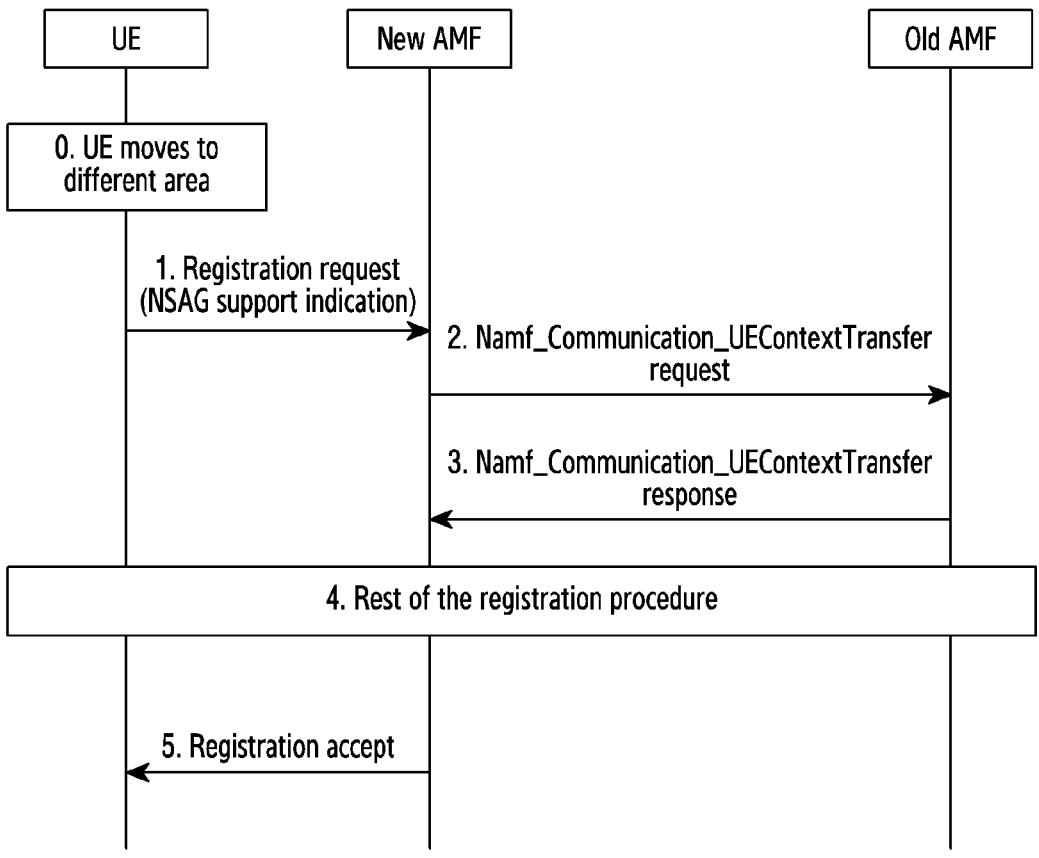
FIG. 5 illustrates a method of providing slice priority information when an AMF of a UE is changed in a registration procedure according to an embodiment of the disclosure.

FIG. 5 illustrates a method of providing slice priority information when an AMF of a UE is changed in a registration procedure.

Step 0. The UE (terminal) moves to another area.

Step 1. A UE registration procedure proceeds. The UE (terminal) transmits a registration request message to the AMF through the RAN.

The corresponding message may include a UE ID (SUCI or 5G-GUTI or PEI), a NSAG support indication (that is, information indicating that the UE supports cell selection and cell reselection based on a network slice priority), a UE policy container.

When the UE provides the NSAG support indication, a new AMF may store the same.

Step 2. When the UE ID received at step 1 is a 5G GUTI (UE identifier information including an AMF identifier), and the AMF knows that the AMF itself is a new AMF for the UE, the new AMF may find the old AMF based on the 5G-GUTI and then may transmit a message requesting a UE context to the old AMF. The corresponding message may include the registration request message received from the UE at step 1.

Step 3. When the message received at step 1 includes the NSAG support indication, the old AMF may add, to a message to be transmitted to the new AMF, the slice priority information (that is, when the UE performs cell selection and reselection based on slice information supported by the cell, a priority for a slice may be determined based on the slice priority information), and information indicating that the slice priority information of the UE has been received.

In an embodiment, when the message from the old AMF includes the slice priority information of the UE, the new AMF may omit a procedure for acquiring slice priority information. In addition, when the message from the old AMF includes the information indicating that the UE has received the slice priority information, the new AMF may omit a procedure for providing priority information to the UE.

Step 4. The rest of the UE registration procedure is performed.

Step 5. The new AMF transmits a registration accept message to the UE. The registration accept message may include the NSAG priority information (that is, the slice priority information) received from the old AMF at step 3.

When the information received from the old AMF at step 3 includes the information indicating that the UE has received the slice priority information, the new AMF may omit the NSAG priority information from the registration accept message.

Step 6. The UE may transmit a registration complete message to the new AMF in response to the message received at step 5.

The registration complete message may include the information indicating that the slice priority information has been received.

When the new AMF receives the information indicating that the slice priority information has been received from the UE, the new AMF may store the information in UE context or may store the information internally.

Figure 6:
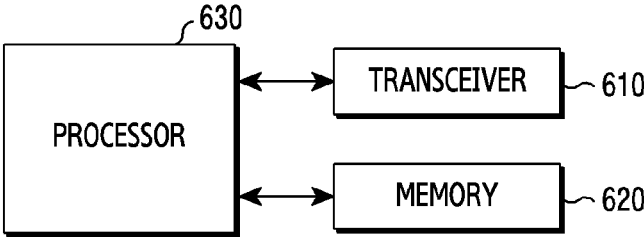
FIG. 6 illustrates a configuration of a UE according to an embodiment of the disclosure.

FIG. 6 illustrates a configuration of a UE according to an embodiment of the disclosure.

As shown in FIG. 6, the UE of the disclosure may include a transceiver 610, a memory 620, and a processor 630. The processor 630, the transceiver 610, and the memory 620 of the UE may operate according to the above-described communication method of the UE. However, the components of the UE are not limited to the above-described example. For example, the UE may include more or fewer components than the above-described components. In addition, the processor 630, the transceiver 610, and the memory 620 may be implemented in the form of a single chip.

A receiver of the UE and a transmitter of the UE are commonly referred to as the transceiver 610, and the transceiver 610 may transmit or receive a signal to or from a base station or a network entity. A signal transmitted to or received from a base station may include control information and data. To achieve this, the transceiver 610 may be configured by an RF transmitter for up-converting and amplifying a frequency of a transmitted signal, and an RF receiver for low-noise amplifying a received signal and down-converting a frequency. However, this is merely an example of the transceiver 610 and the components of the transceiver 610 are not limited to the RF transmitter and the RF receiver.

In addition, the transceiver 610 may include a wired or wireless transceiver, and may include various configurations for transmitting or receiving a signal.

In addition, the transceiver 610 may receive a signal through a wireless channel and may output the signal to the processor 630, and may transmit a signal outputted from the processor 630 through a wireless channel.

In addition, the transceiver 610 may receive a communication signal and may output the communication signal to the processor, and may transmit a signal outputted from the processor to a network entity through a wired or wireless network.

The memory 620 may store a program used for operations of the UE, and data. In addition, the memory 620 may store control information or data included in a signal acquired at the UE. The memory 620 may be configured by a storage medium such as a read only memory (ROM), a random access memory (RAM), a hard disk, a compact disc (CD)-ROM, and a digital versatile disk (DVD), or a combination of the storage media.

The processor 630 may control a series of processes to operate the UE according to the above-described embodiments of the disclosure. The processor 630 may include at least one or more processors. For example, the processor 630 may include a communication processor (CP) to control communication, and an application processor to control a higher layer such as an application program.

Figure 7:
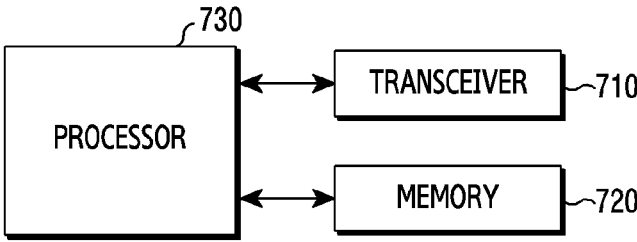
FIG. 7 illustrates a configuration of a network entity according to an embodiment of the disclosure.

FIG. 7 illustrates a configuration of a network entity according to an embodiment of the disclosure.

As shown in FIG. 7, the network entity of the disclosure may include a transceiver 710, a memory 720, and a processor 730. The processor 730, the transceiver 710, and the memory 720 of the network entity may operate according to the above-described communication method of the network entity. However, the components of the network entity are not limited to the above-described example. For example, the network entity may include more or fewer components than the above-described components. In addition, the processor 730, the transceiver 710, and the memory 720 may be implemented in the form of a single chip. The network entity may include a network function (NF) such as an access and mobility management function (AMF), a session management function (SMF), a policy and charging function (PCF), a network exposure function (NEF), unified data management (UDM), a unified data repository (UDR), a user plane function (UPF) as described above. In addition, the network entity may include a base station.

A receiver of the network entity and a transmitter of the network entity are commonly referred to as the transceiver 710, and the transceiver 710 may transmit or receive a signal to or from a UE or another network entity. A transceived signal may include control information and data. To achieve this, the transceiver 710 may be configured by an RF transmitter for up-converting and amplifying a frequency of a transmitted signal, and an RF receiver for low-noise amplifying a received signal and down-converting a frequency. However, this is merely an example of the transceiver 710 and the components of the transceiver 710 are not limited to the RF transmitter and the RF receiver. The transceiver 710 may include a wired or wireless transceiver, and may include various configurations for transmitting or receiving a signal.

In addition, the transceiver 710 may receive a signal through a communication channel (for example, a wireless channel) and may output the signal to the processor 730, and may transmit a signal outputted from the processor 730 through a communication channel.

In addition, the transceiver 710 may receive a communication signal and may output the communication signal to the processor, and may transmit a signal outputted from the processor to a UE or a network entity through a wired or wireless network.

The memory 720 may store a program used for operations of the network entity, and data. In addition, the memory 720 may store control information or data included in a signal acquired at the network entity. The memory 720 may be configured by a storage medium such as a ROM, a RAM, a hard disk, a CD-ROM, and a DVD, or a combination of the storage media.

The processor 730 may control a series of processes to operate the network entity according to the above-described embodiments of the disclosure. The processor 730 may include at least one or more processors.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

An order of explanation on the drawings describing the methods of the disclosure does not necessarily correspond to an order of execution, and the order of operations may be changed or operations may be performed in parallel. In addition, the drawings describing the methods of the disclosure may omit some components or may include only some component without departing from the essence of the disclosure.

In addition, the methods of the disclosure may be executed in combination of a part or all of the contents included in the respective embodiments without departing from the essence of the disclosure.

Embodiments of the disclosure disclosed in the specification and the drawings propose specific examples for easy explanation of the technical features of the disclosure and for easy understanding of the disclosure, and do not limit the scope of the disclosure. That is, it is obvious to a person skilled in the art that other variations based on the technical concept of the disclosure are possible.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a policy control function (PCF) entity in a wireless communication system, the method comprising:

receiving, from an access and mobility management function (AMF) entity, a first user equipment (UE) policy control create request message for a UE policy association including:

a subscription permanent identifier (SUPI) of a UE, and a network slice access stratum (AS) group (NSAG) support indication indicating that the UE supports cell selection and cell reselection based on a network slice priority; and transmitting, to the AMF entity, a response message including a policy control request (PCR) trigger for change of a NSAG instructing transmission of a reporting message in case that NSAG mapping information indicating a mapping relationship between slice groups and slices, NSAG priority information, or both are changed.

2. The method of claim 1, further comprising:

generating UE policy information based on at least one of the NSAG mapping information or the NSAG priority information; and transmitting, to the UE, a first UE policy container including the UE policy information via the AMF, wherein the UE policy information includes a UE route selection policy (URSP) rule.

3. The method of claim 2, further comprising:
receiving, from the AMF entity, a second UE policy control create request message including the SUPI of the UE and NSAG information including at least one of changed NSAG mapping information or changed NSAG priority information;
determining a new URSP rule based on the NSAG information; and
transmitting, to the UE, a second UE policy container including the new URSP rule via the AMF.
4. The method of claim 3, further comprising:
determining whether to generate the new URSP based on the NSAG information; and
maintaining the URSP rule in case that the generation of the new URSP is not needed.
5. The method of claim 2, further comprising:
transmitting, to a unified data repository (UDR) entity, a Nudr_DM_Query request message requesting a subscription information of the UE; and
receiving, from the UDR entity, the requested subscription information of the UE,
wherein the UE policy information is generated based on the subscription information of the UE.
6. A method performed by an access and mobility management function (AMF) entity in a wireless communication system, the method comprising:
receiving, from a user equipment (UE), a registration request message including a network slice access stratum (AS) group (NSAG) support indication indicating that the UE supports cell selection and cell reselection based on a network slice priority;
transmitting, to a policy control function (PCF) entity, a first UE policy control create request message for a UE policy association including a subscription permanent identifier (SUPI) of the UE and the NSAG support indication; and
receiving, from the PCF entity, a response message including a policy control request (PCR) trigger for change of a NSAG instructing transmission of a reporting message in case that NSAG mapping information indicating a mapping relationship between slice groups and slices, NSAG priority information, or both are changed.
7. The method of claim 6, further comprising:
receiving, from the PCF entity, a first UE policy container including UE policy information including a UE route selection policy (URSP) rule; and
transmitting, to the UE, the first UE policy container,
wherein the UE policy information is generated based on at least one of the NSAG mapping information or the NSAG priority information.
8. The method of claim 7, further comprising:
transmitting, to the PCF entity, a second UE policy control create request message including:
the SUPI of the UE, and
NSAG information including at least one of changed NSAG mapping information or changed NSAG priority information, in case that at least one of the NSAG mapping information or the NSAG priority information is changed;
receiving, from the PCF entity, a second UE policy container including a new URSP rule; and
transmitting, to the UE, the second UE policy container,
wherein the new URSP rule is determined based on the NSAG information.
9. A policy control function (PCF) entity in a wireless communication system, the PCF entity comprising:

22 a transceiver; and
a controller operably coupled to the transceiver, the controller configured to:
receive, from an access and mobility management function (AMF) entity:
a first user equipment (UE) policy control create request message for a UE policy association including a subscription permanent identifier (SUPI) of a UE, and
a network slice access stratum (AS) group (NSAG) support indication indicating that the UE supports cell selection and cell reselection based on a network slice priority; and
transmit, to the AMF entity, a response message including policy control request (PCR) trigger for change of a NSAG instructing transmission of a reporting message in case that NSAG mapping information indicating a mapping relationship between slice groups and slices, NSAG priority information, or both are changed.
10. The PCF entity of claim 9, wherein the controller is further configured to:
generate UE policy information based on at least one of the NSAG mapping information or the NSAG priority information; and
transmit, to the UE, a first UE policy container including the UE policy information via the AMF,
wherein the UE policy information includes a UE route selection policy (URSP) rule.
11. The PCF entity of claim 10, wherein the controller is further configured to:
receive, from the AMF entity, a second UE policy control create request message including the SUPI of the UE and NSAG information including at least one of changed NSAG mapping information or changed NSAG priority information;
determine a new URSP rule based on the NSAG information; and
transmit, to the UE, a second UE policy container including the new URSP rule via the AMF.
12. The PCF entity of claim 11, wherein the controller is further configured to:
determine whether to generate the new URSP based on the NSAG information; and
maintain the URSP rule, in case that the generation of the new URSP is not needed.
13. The PCF entity of claim 10, wherein the controller is further configured to:
transmit, to a unified data repository (UDR) entity, a Nudr_DM_Query request message requesting a subscription information of the UE; and
receive, from the UDR entity, the subscription information of the UE,
wherein the UE policy information is generated based on the subscription information of the UE.
14. An access and mobility management function (AMF) entity in a wireless communication system, the AMF entity comprising:
a transceiver; and
a controller operably coupled to the transceiver, the controller configured to:
receive, from a user equipment (UE), a registration request message including a network slice access stratum (AS) group (NSAG) support indication indicating that the UE supports cell selection and cell reselection based on a network slice priority;
transmit, to a policy control function (PCF) entity, a first UE policy control create request message for a UE policy association including a subscription permanent identifier (SUPI) of the UE and the NSAG support indication; and receive, from the PCF entity, a response message including a policy control request (PCR) trigger for change of a NSAG instructing transmission of a reporting message in case that NSAG mapping information indicating a mapping relationship between slice groups and slices, NSAG priority information, or both are changed.

15. The AMF entity of claim 14, wherein the controller is further configured to:

receive, from the PCF entity, a first UE policy container including UE policy information including a UE route selection policy (URSP) rule; and transmit, to the UE, the first UE policy container, wherein the UE policy information is generated based on at least one of the NSAG mapping information or the NSAG priority information.

16. The AMF entity of claim 15, wherein the controller is further configured to:

transmit, to the PCF entity, a second UE policy control create request message including:

the SUPI of the UE, and

NSAG information including at least one of changed NSAG mapping information or changed NSAG priority information, in case that at least one of the NSAG mapping information or the NSAG priority information is changed;

receive, from the PCF entity, a second UE policy container including a new URSP rule; and transmit, to the UE, the second UE policy container, wherein the new URSP rule is determined based on the NSAG information.

* * * * *